United States Patent
Miriyala et al.

(10) Patent No.: US 11,700,236 B2
(45) Date of Patent: Jul. 11, 2023

(54) PACKET STEERING TO A HOST-BASED FIREWALL IN VIRTUALIZED ENVIRONMENTS

(71) Applicant: Juniper Networks, Inc., Sunnyvale, CA (US)

(72) Inventors: Prasad Miriyala, San Jose, CA (US); Aniket G. Daptari, San Jose, CA (US); Fei Chen, Beijing (CN); Pranavadatta D N, Bangalore (IN); Kiran K N, Bangalore (IN); Jeffrey S. Marshall, Santa Clara, CA (US); Prakash T. Seshadri, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 568 days.

(21) Appl. No.: 16/652,643

(22) PCT Filed: Feb. 27, 2020

(86) PCT No.: PCT/CN2020/076930
§ 371 (c)(1),
(2) Date: Mar. 31, 2020

(87) PCT Pub. No.: WO2021/168727
PCT Pub. Date: Sep. 2, 2021

(65) Prior Publication Data
US 2022/0303246 A1 Sep. 22, 2022

(51) Int. Cl.
*G06F 21/53* (2013.01)
*H04L 9/40* (2022.01)
(Continued)

(52) U.S. Cl.
CPC ...... *H04L 63/0263* (2013.01); *G06F 9/45558* (2013.01); *H04L 12/4679* (2013.01);
(Continued)

(58) Field of Classification Search
CPC ....... H04L 41/12; H04L 41/122; H04L 43/20; H04L 45/00; H04L 45/76; H04L 49/60
See application file for complete search history.

(56) References Cited

U.S. PATENT DOCUMENTS

| | | |
|---|---|---|
| 9,282,164 B2 | 3/2016 | Finn et al. |
| 9,325,735 B1 | 4/2016 | Xie et al. |
(Continued)

FOREIGN PATENT DOCUMENTS

| | | |
|---|---|---|
| CN | 103414631 A | 11/2013 |
| CN | 103763367 A | 4/2014 |
(Continued)

OTHER PUBLICATIONS

"3.2 Rules Headers," SNORTUsers Manual 2.9.11, Applicant points out, in accordance with MPEP 609.04(a), that the year of publication, 2008, is sufficiently earlier than the effective U.S. filing date, 2017, so that the particular month of publication is not an issue, accessed from http://manual-snort-org.s3-website-us-east-1.amazonaws.com/node29.html#SECTION004210000000000000000, 4 pp.

(Continued)

*Primary Examiner* — Bo Hui A Zhu
(74) *Attorney, Agent, or Firm* — Shumaker & Sieffert, P.A.

(57) ABSTRACT

Techniques are disclosed for redirecting network traffic of virtualized application workload to a host-based firewall. For example, a system comprises a software defined networking (SDN) controller of a multi-tenant virtualized data center configured to: receive a security policy expressed as one or more tags to redirect traffic of a virtualized application workload to a host-based firewall (HBF) of the multi-tenant virtualized data center; configure network connectivity to the HBF in accordance with the security policy; a security controller that manages the HBF configured to: obtain the one or more tags from the SDN controller; receive (Continued)

one or more firewall policies expressed in terms of the one or more tags, wherein each of the one or more firewall policies specifies a function of the HBF; and configure the function of the HBF in accordance with the one or more firewall policies.

20 Claims, 6 Drawing Sheets

(51) Int. Cl.
  *H04L 45/76* (2022.01)
  *H04L 41/0894* (2022.01)
  *G06F 9/455* (2018.01)
  *H04L 12/46* (2006.01)

(52) U.S. Cl.
  CPC .......... *H04L 41/0894* (2022.05); *H04L 45/76* (2022.05); *G06F 2009/45587* (2013.01); *G06F 2009/45595* (2013.01)

(56) References Cited

U.S. PATENT DOCUMENTS

| | | | |
|---|---|---|---|
| 9,680,875 | B2 | 6/2017 | Knjazihhin et al. |
| 10,484,334 | B1 | 11/2019 | Lee et al. |
| 10,567,440 | B2 | 2/2020 | Bansal et al. |
| 10,728,288 | B2 | 7/2020 | Miriyala |
| 2012/0005724 | A1 | 1/2012 | Lee |
| 2014/0033268 | A1 | 1/2014 | Julisch et al. |
| 2014/0245423 | A1 | 8/2014 | Lee |
| 2015/0081893 | A1 | 3/2015 | Chadwell et al. |
| 2015/0124809 | A1 | 5/2015 | Edsall et al. |
| 2016/0261486 | A1 | 9/2016 | Fang et al. |
| 2018/0109450 | A1 | 4/2018 | Filsfils et al. |
| 2018/0316729 | A1 | 11/2018 | Chauvet et al. |
| 2019/0014124 | A1 | 1/2019 | Reddy et al. |
| 2019/0158537 | A1 | 5/2019 | Miriyala |
| 2019/0158541 | A1 | 5/2019 | Miriyala et al. |
| 2021/0218630 | A1* | 7/2021 | Lu .......................... H04L 41/065 |
| 2021/0218652 | A1* | 7/2021 | Raut ................... H04L 41/0803 |

FOREIGN PATENT DOCUMENTS

| | | |
|---|---|---|
| CN | 106685903 A | 5/2017 |
| WO | 2013184846 A1 | 12/2013 |
| WO | 2017064560 A1 | 4/2017 |
| WO | 2017103699 A1 | 6/2017 |

OTHER PUBLICATIONS

"Firewall as a Service API 2.0," OpenStack Neutron Team, OpenStack Cloud Software, last updated Sep. 21, 2017, accessed from https://specs.openstack.org/openstack/neutron-specs/specs/newton/fwaas-api-2.0.html, 31 pp.

"Juniper / Contrail-specs / fw_security_enhancements.md," GitHub, May 20, 2017, accessed from https://github.com/Juniper/contrail-specs/blob/master/fw_security_enhancements.md, 10 pp.

"Service group and Service Object support," OpenStack Neutron Team, OpenStack Cloud Software, last updated Mar. 17, 2015, accessed from http://specs.openstack.org/openstack/neutron-specs/specs/kilo/service-group.html, 7 pp.

Sajassi et al., "BGP MPLS-Based Ethernet VPN," RFC 7432, Internet Engineering Task Force (IETF), Feb. 2015, 56 pp.

Sangli et al., "BGP Extended Communities Attribute," RFC 4360, Network Working Group, Feb. 2006, 12 pp.

"Contrail™ Contrail Networking and Security User Guide," Juniper Networks, Release 5.1, May 17, 2019, 166 p.

Pisharody et al. "Brew: A Security Policy Analysis Framework for Distributed SDN-Based Cloud Environments," Jul. 12, 2017, published in IEEE Transactions on Dependable and Secure Computing, vol. 16, No. 6, Nov.-Dec. 1, 2019, 15 pp.

International Search Report dated Nov. 26, 2020 received in counterpart International Application No. PCT/CN2020/076930, 4 pp.

Written Opinion dated Nov. 26, 2020 received in counterpart International Application No. PCT/CN2020/076930, 4 pp.

International Preliminary Report on Patentability from International Application No. PCT/CN2020/076930 dated Sep. 9, 2022, 6 pp.

* cited by examiner

PACKET STEERING TO A HOST-BASED FIREWALL IN VIRTUALIZED ENVIRONMENTS

This application claims the benefit of U.S. International Application Serial Number PCT/CN2020/076930, filed 27 Feb. 2020 and entitled PACKET STEERING TO A HOST-BASED FIREWALL IN VIRTUALIZED ENVIRONMENTS, the entire contents of which is hereby incorporated by reference.

TECHNICAL FIELD

This disclosure generally relates to computer networks, and more specifically, to packet steering for a virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various hosting facilities.

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

SUMMARY

In general, the disclosure describes techniques for providing a policy framework to steer network traffic of virtualized application workloads to a host-based service, such as a host-based firewall. In some virtualized environments, certain firewalls may provide security only up to the transport layer (e.g., layer 4 (L4)) of the Open System Interconnection (OSI) model. These firewalls may be referred to as L4 firewalls. Other firewalls, typically referred to as next-generation firewalls (NGFWs) or L7 firewalls, provide security for the application layer (e.g., layer 7 (L7)). For example, NGFW firewalls may provide functions, such as Intrusion Prevention Systems (IPS), Intrusion Detection Systems (IDS), anti-virus (AV), malware detection, and other security functions not provided by the L4 firewalls. As further described in this disclosure, a policy framework is provided to enable users to define tag-based policies to integrate NGFW firewalls with L4 firewalls to provide network security for a wider range of layers of the OSI model.

In one example, a centralized controller (e.g., Software Defined Networking (SDN) controller) provides network function virtualization for a multi-tenant virtualized data center to steer network traffic of virtualized application workloads to a NGFW, such as a host-based filter (HBF). For example, a user may use the SDN controller to specify a policy to control network traffic of a virtualized application workload. The policy is expressed in terms of one or more tags that categorize one or more objects of a data model for the application workload to control network traffic between the tagged objects. For instance, a user may tag objects as applications (e.g., human resource application, finance application, sales application, etc.), application tiers (e.g., web, application, database), and other categorizations. A user may use the tags to define a policy for an application workload to direct traffic of the application workload (e.g., between a web tier and an application tier) and, in accordance with the techniques described in this disclosure, to redirect the traffic of the application workload to an HBF.

A security controller that manages the firewall policies of the HBF obtains the one or more tags from the SDN controller such that the user (or another user) may use the security controller to specify one or more firewall policies expressed in terms of the one or more tags for the HBF. For example, the user may define a firewall policy expressed in terms of the one or more tags that specifies a function for instances of the HBF, such as IPS, IDS, AV, malware detection, and other security functions, to be applied to network traffic of the application workload. In this way, the policy framework as described herein enables a user to specify firewall policies expressed in terms of one or more tags recognized by the virtual network constructs deployed in the virtualized environment, therefore integrating NGFWs that may, in some instances, be provided and managed by third-parties to the virtualized environment.

The techniques described in this disclosure may provide one or more technical advantages that realizes at least one practical application. For example, the policy framework described in the disclosure enables the integration of host-based firewalls implemented in multiple scenarios, such as a host-based firewall implemented on a virtual machine or container, or host-based firewalls managed by third-party security controllers that may not originally support tag-based policies. Moreover, the techniques of the disclosure provide intra-network service chaining to host-based firewalls, therefore enabling host-based firewalls to be implemented close to application workloads and improved performance.

In one example, this disclosure describes a method comprising receiving, by a software defined networking (SDN) controller of a multi-tenant virtualized data center, a security policy expressed as one or more tags to redirect traffic of a virtualized application workload to a host-based firewall (HBF) of the multi-tenant virtualized data center. The method also comprises configuring, by the SDN controller, a virtual router to direct traffic of the virtualized application workload to the HBF in accordance with the security policy. The method further comprises obtaining, by a security controller that manages the HBF, the one or more tags from the SDN controller. Additionally, the method comprises receiving, by the security controller, one or more firewall policies expressed in terms of the one or more tags, wherein each of the one or more firewall policies specifies a function of the HBF. The method further comprises configuring, by the security controller, the function of the HBF in accordance with the one or more firewall policies.

In another example, this disclosure describes a system comprising a software defined networking (SDN) controller of a multi-tenant virtualized data center configured to receive a security policy expressed as one or more tags to redirect traffic of a virtualized application workload to a host-based firewall (HBF) of the multi-tenant virtualized data center; and configure network connectivity to the HBF in accordance with the security policy. The system also comprises a security controller that manages the HBF configured to: obtain the one or more tags from the SDN controller; receive one or more firewall policies expressed in terms of the one or more tags, wherein each of the one or more firewall policies specifies a function of the HBF; and configure the function of the HBF in accordance with the one or more firewall policies.

In another example, this disclosure describes a non-transitory computer-readable medium comprising instructions that, when executed, cause one or more processors of a multi-tenant virtualized data center to: receive a security policy expressed as one or more tags to redirect traffic of a virtualized application workload to a host-based firewall (HBF) of the multi-tenant virtualized data center; configure network connectivity to the HBF in accordance with the security policy; receive one or more firewall policies expressed in terms of the one or more tags, wherein each of the one or more firewall policies specifies a function of the HBF; and configure the function of the HBF in accordance with the one or more firewall policies.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
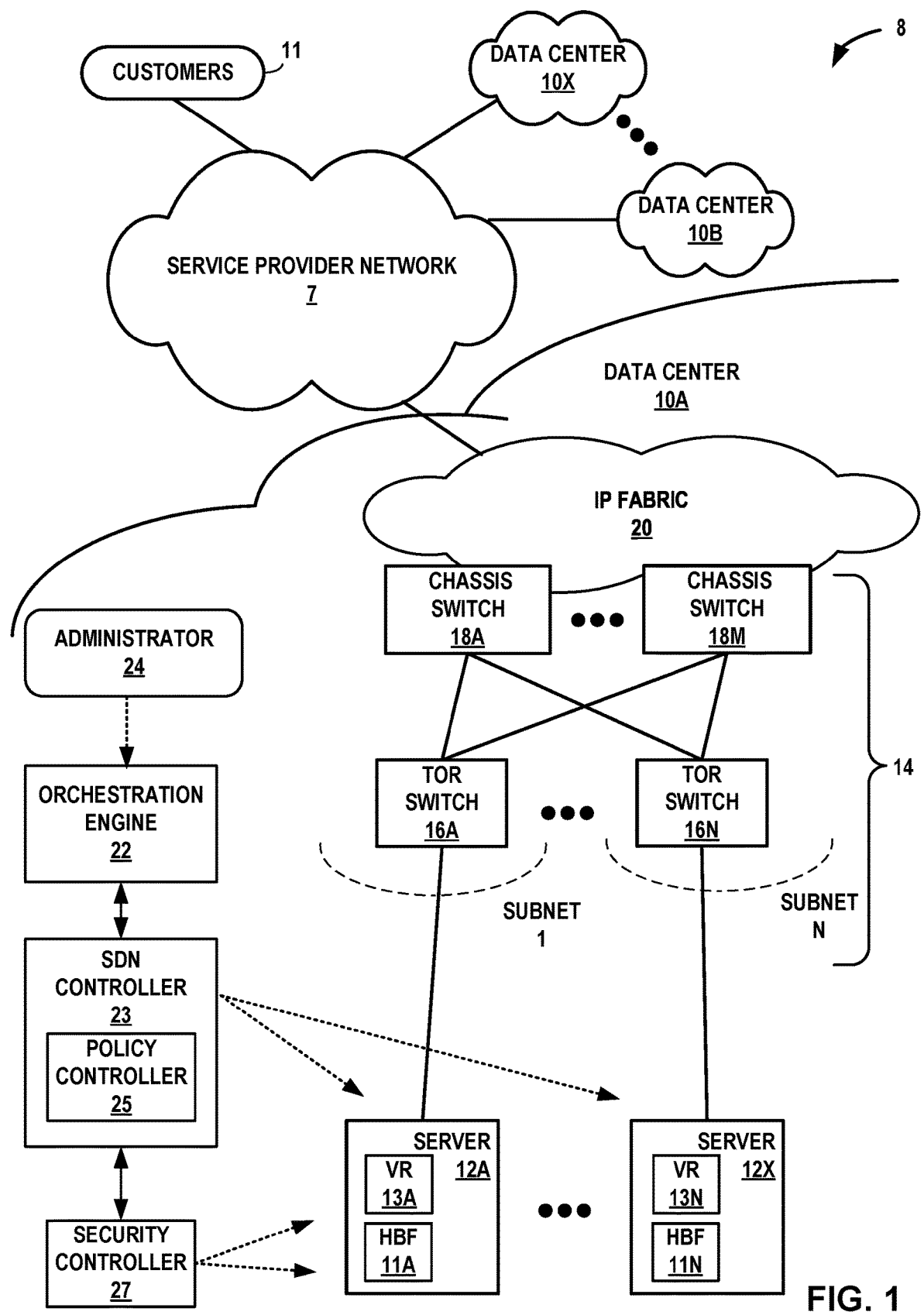
FIG. 1 is a block diagram illustrating an example network system in which network traffic of virtualized application workloads are redirected to host-based firewalls, in accordance with techniques described in this disclosure.

FIG. 1 is a block diagram illustrating an example network system in which network traffic of virtualized application workloads are redirected to host-based firewalls, in accordance with techniques described in this disclosure. Network system 2 in the example of FIG. 1 includes data centers 10A-10X (collectively, "data centers 10") interconnected with one another and with customer networks associated with customers 11 via a service provider network 7. In general, each data center 10 provides an operating environment for applications and services for customers 11 coupled to the data center by service provider network 7. Data centers 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, each data center 10 may represent one of many geographically distributed network data centers. As illustrated in the example of FIG. 1, each of data centers 10 may be a facility that provides network services for customers 11. Customers 11 may be collective categories such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, each of data centers 10 may be individual network servers, network peers, or otherwise.

In this example, each of data centers 10 includes a set of storage systems and application servers 12A-12X (herein, "servers 12") interconnected via high-speed switch fabric 14 provided by one or more tiers of physical network switches and routers. Servers 12 function as compute nodes of the data center. In some examples, the terms "compute nodes" and "servers" are used interchangeably herein to refer to servers 12. Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. The term "virtual execution element" encompasses virtual machines ("VMs"), containers, and other virtualized computing resources that provide an (at least partially) independent execution environment for applications. These virtual execution elements can be tenants running virtualized application workloads, and may be referred to herein as a virtualized application workload (or just application workload). Each of the virtual network endpoints may use one or more virtual network interfaces to perform packet I/O or otherwise process a packet.

Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, each of data centers 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data centers 10 and customers 11 by service provider network 7.

Network system 2 implements an automation platform for automating deployment, scaling, and operations of virtual execution elements across servers 12 to provide virtualized infrastructure for execution of application workloads and services. For example, data centers 10 may include a Software-Defined Network ("SDN") platform to control and manage network behavior. In some cases, an SDN platform includes a logically centralized, and in some cases, physically distributed SDN controller, e.g., SDN controller 23, and a distributed forwarding plane in the form of virtual routers, e.g., virtual routers 13A-13N (collectively, "VRs 13"), that extend the network from physical routers and switches in the data center switch fabric into a virtual overlay network hosted in virtualized servers. SDN controller 23 facilitates operation of one or more virtual networks within each of data centers 10, such as data center 10A, in accordance with one or more examples of this disclosure. Virtual networks are logical constructs implemented on top of the physical network of data center 10A. In some examples, virtual networks may be implemented on a virtual private network (VPN), virtual LAN (VLAN), or the like. In some examples, SDN controller 23 may operate in response to configuration input received from orchestration engine 22, which in turn operates in response to configuration input received from network administrator 24. Additional information regarding SDN controller 23 operating in conjunction with other devices of data center 10A or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

In some examples, orchestration engine 22 manages application-layer functions of data center 10 such as managing compute, storage, networking, and application resources executing on servers 12. "Orchestration," in the context of a virtualized computing infrastructure, generally refers to provisioning, scheduling, and managing virtual execution elements and/or applications and application services executing on such virtual execution elements to the host servers available to the orchestration platform. For example, orchestration engine 22 may attach virtual machines (VMs) to a tenant's virtual network and generally manage the launching, migration and deconstruction of the VMs as needed. In other examples, container orchestration permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Orchestrator 22 and SDN controller 23 together implement a controller for the network system 2. Orchestrator 22 and SDN controller 23 may execute on separate computing devices or execute on the same computing device. Each of orchestrator 22 and SDN controller 23 may be a distributed application that executes on one or more computing devices.

In some examples, SDN controller 23 is a lower-level controller tasked with managing the network and networking services of data center 10A and, in particular, virtual services such as virtual firewalls of servers 12. SDN controller 23 utilizes a set of communication protocols to configure the network. A communication protocol may include a messaging protocol such as eXtensible Messaging and Presence Protocol (XMPP), for example. For example, SDN controller 23 implements high-level requests from orchestration engine 22 by configuring physical switches, e.g. TOR switches 16, chassis switches 18, and switch fabric 14; physical routers; physical service nodes such as firewalls and load balancers; and virtual services such as virtual firewalls in a VM. SDN controller 23 maintains routing, networking, and configuration information within a state database. SDN controller 23 communicates a suitable subset of the routing information and configuration information from the state database to virtual network (VN) agents on each of servers 12A-12N.

In the example of FIG. 1, network system 2 implements a scalable, multi-dimensional policy framework to support application of policies for controlling network traffic among application workloads executing within one or more computing environments for data centers 10. Application workloads may be categorized (e.g., identified) using one or more tags. As described herein, a "tag" may refer to information used to categorize an object of a data model for an application workload according to a particular value or set of values. Tags may, in some examples, categorize an object based on application type, application tier (e.g., web tier, application tier, database tier), deployment (e.g., development, QA, staging, or production stage), geographic site, user, or compliance. As one example, a user may tag objects of a finance application workload, such as applications (e.g., application=finance), application tiers (e.g., tier=web, tier=application).

In further examples, a user may define "labels" to be used as a customized tag. Other examples of tags may include tags describing infrastructure, such as a compute node, rack, groups of logically-related elements (sometimes referred to as "pods" for some orchestration platforms, e.g., Kubernetes), cluster, or data center which is provisioned to support the application. Tags may be predefined, implicitly assigned during provisioning, or may be customized via SDN controller 23 or upload tag configurations (e.g., in JSON format). Tags may be defined at different levels such as a global environment level, a project level, a virtual network level, a virtual machine or container level, and an interface level. In some examples, multiple tags are applied to a single object, but the object may only have a single tag per type and/or category. Furthermore, as used herein, "tagging" an object refers to categorizing the object in a category specified by a tag included in a policy rule. Although tags are described as the mechanism to categorize an object, the techniques are not limited to the use of tags. Any mechanism to categorize an object may be utilized, and tags is one example way in which to categorize an object. Additional examples of tagging are described in U.S. application Ser. No. 16/024,412, entitled "POLICY-DRIVEN WORKLOAD LAUNCHING BASED ON SOFTWARE DEFINED NETWORKING ENCRYPTION POLICIES," filed Jun. 29, 2018, the entire contents of which is incorporated by reference herein.

In some examples, the policy framework described herein permits an administrator, e.g., administrator 24, to specify a policy expressed in terms of one or more tags that categorize one or more objects of a data model for the application workload to control network traffic between the tagged objects. In some examples, the policy rules may be pre-configured and are configured on HBFs 11 when HBFs 11 are created.

As one example, administrator 24 may use a policy controller 25 of the SDN controller 23 to define tags for objects of a finance application workload. For the finance application workload, administrator 24 may define an application tag (e.g., application=finance) and application tier tags (e.g., tier=web and tier=application). Administrator 24 may use the tags to control traffic of the finance application workload, such as to direct traffic from a web tier to an application tier, for example. Tagged objects of the finance application workload may be used to define a security policy for the traffic, such as whether to allow or deny the traffic. As another example, administrator 24 may use a policy controller 25 to define tags for objects of a sales application workload. For the sales application workload, administrator 24 may define an application tag (e.g., application=sales) and application tier tags (e.g., tier=web, tier=application, and tier=database). Administrator 24 may use the tags to control traffic of the sales application workload to direct traffic from a web tier to an application tier, which is then directed to a database tier. Tagged objects of the sales application workload may be used to define a security policy for the traffic, such as whether to allow or deny the traffic. SDN controller 23 may send the tag-based security policies and routing instances to servers 12 using, for example, XMPP, which installs a forwarding state into the forwarding plane of virtual routers 13.

In some examples, VMs of servers 12 are configured to provide network services, such as firewalls. In some instances, certain firewalls may provide security only up to the transport layer (e.g., layer 4). In other words, these firewall may provide security for the physical layer (L1), data link layer (L2), network layer (L3), and transport layer (L4), but may not provide security for higher layers, such as the application layer (L7). These firewalls may be referred to as "L4 firewalls." Firewalls that provide security for the application layer, typically referred to as next-generation firewalls (NGFWs) or L7 firewalls, may be integrated with L4 firewalls to provide protection for a wider range of layers. For example, NFGWs, such as HBFs 11A-11N (collectively, "HBFs 11"), may provide functions, such as Intrusion Prevention Systems (IPS), Intrusion Detection Systems (IDS), anti-virus (AV), malware detection, and other security functions. Although NGFWs are described herein as host-based firewalls (HBFs), NGFWs may also include physical firewalls. In the example of FIG. 1, HBFs 11 are implemented using a virtualized execution element, such as a VM or one or more containers of servers 12. HBFs 11 may support various modes, such as routing, transparent, and bump-in-the-wire (BITW).

In some examples, a separate controller, such as security controller 27, manages firewall policies of HBFs 11. Without the techniques described in this disclosure, security controllers may not support tag-based policies, which may prevent HBFs managed by these security controllers from being integrated into a virtual environment that supports tag-based policies.

In accordance with the techniques described in this disclosure, network system 2 provides a policy framework to enable users to define tag-based policies to integrate host-based services, such as HBFs 11 (e.g., L7 firewalls) with L4 firewalls. In the example of FIG. 1, HBF 11A is implemented on a virtual execution element (e.g., VM or container) hosted on server 12A. Similarly, HBF 11N is implemented on a virtual execution element hosted on server 12N.

In the example of FIG. 1, the policy framework enables administrator 24 to further define the security policies to redirect network traffic to HBFs 11 to utilize functions of HBFs 11 such as IPS, IDS, AV, malware detection, and other security functions. In other words, policy controller 25 is used to manage virtual network constructs to direct traffic to HBFs 11. As one example, administrator 24 may use policy controller 25 to define a security policy to direct traffic from a web tier to an application tier of the finance application workload, and then to redirect the traffic to HBF 11A. In this example, administrator 24 may use policy controller 25 to define the security policy as:

Tier=Web→Tier=App all traffic to HBF

Policy controller 25 may push the security policy to distributed policy agents executing on computing devices, e.g., servers 12, that host the finance application workload. The policy agent for server 12A may apply the security policies to tagged objects that are members of categories (e.g., tier=web, tier=application) of the finance application workload to redirect traffic to HBF 11A. The policy agent for server 12A may map the tags to ports ("tags-to-port mappings") of virtual execution elements that implement the HBF.

Administrator 24 (or another user) may, in some instances, use different controller that manages HBF 11A, e.g., security controller 27, to specify a function (e.g., firewall policy) of HBF 11A to be applied to network traffic of the finance application workload. Although policy controller 25 and security controller 27 is illustrated in the example of FIG. 1 as separate controllers, policy controller 25 and security controller 27 may in some instances be a single controller that manages virtual network constructs and firewall policies of HBFs 11.

In the example of FIG. 1, administrator 24 may use security controller 27 to specify a function of HBF 11A, such as IPS to be applied to traffic of the finance application workload. In some examples, security controller 27 may learn the tenants and tags from policy controller 25 such that administrator 24 may use security controller 27 to configure one or more firewall policies for HBF 11A for the finance application workload. For example, security controller 27 may obtain information from SDN controller 23 the configuration information for an application workload running on servers 12. For example, security controller 27 may communicate with policy controller 25 to learn about tenants, virtual networks, VMs belonging to the virtual networks, and any associated tags for the finance application workload, and uses the information about tenants and tags to configure firewall policies (e.g., security functions) for the HBF. In this example, administrator 24 may define the firewall policy for HBF 11A to provide IPS for HTTPs traffic of the finance application workload, as shown below:

Tier=Web→Tier=App service HTTPs to IPS

In some examples, administrator 24 may use policy controller 25 to define another firewall policy for different traffic of the finance application workload. For example, administrator may define a firewall policy for HBF 11A to provide malware detection for HTTP traffic of the finance application workload, as shown below:

Tier=Web→Tier=App service HTTP to malware detection

Distributed policy agents executing on computing devices, e.g., servers 12, that host the finance application workload may then apply the security policies to tagged objects that are members of categories to redirect traffic to HBF 11A and to apply the security functions provided by HBF 11A as defined by the firewall policies.

In some examples, administrator 24 may use policy controller 25 to define a security policy for another instance of HBF 11A, such as for the sales application workload. In this example, administrator 24 may use policy controller 25 to define a security policy for the virtual router 13A to direct traffic from a web tier to an application tier of the sales application workload, from the application tier to a database tier, and then redirect the traffic to HBF 11A. In this example, administrator 24 may use policy controller 25 to define the security policy to redirect traffic of the sales application workload to the HBF, as shown below:

Tier=Web→Tier=App service SQL traffic to HBF

Policy controller 25 may push the security policy to distributed policy agents executing on computing devices, e.g., servers 12, that host the sales application workload. The policy agent for server 12A may apply the security policies to tagged objects that are members of categories (e.g., tier=web, tier=application, tier=database) of the sales application workload to redirect traffic to HBF 11A. The policy agent for server 12A may map the tags to ports ("tags-to-port mappings") of virtual execution elements that implement the HBF.

Administrator 24 may use security controller 27 to specify a function of HBF 11A (e.g., anti-virus) to be applied to traffic of the sales application workload. In some examples, security controller 27 may learn the tenants and tags from policy controller 25 such that administrator 24 may use security controller 27 to configure one or more firewall policies for HBF 11A for the sales application workload. For example, security controller 27 may obtain information from SDN controller 23 the configuration information for an application workload running on servers 12. For example, security controller 27 may communicate with policy controller 25 to learn about tenants, virtual networks, VMs belonging to the virtual networks, and any associated tags for the sales application workload, and uses the information about tenants and tags to configure firewall policies for the HBF. In examples where there are multiple instances of HBF, the tenant information may include an identifier, such as a virtual local area network (VLAN) identifier to determine the HBF instance for a particular tenant. In this example, administrator 24 may define the firewall policy for HBF 11A to provide anti-virus protection for traffic of the sales application workload, as shown below:

Tier=Web→Tier=App service SQL traffic to AV

Distributed policy agents executing on computing devices, e.g., servers 12, that host the sales application workload may then apply the security policies to tagged objects that are members of categories to redirect traffic to HBF 11A and to apply the security functions provided by HBF 11A as defined by the firewall policies.

Figure 2:
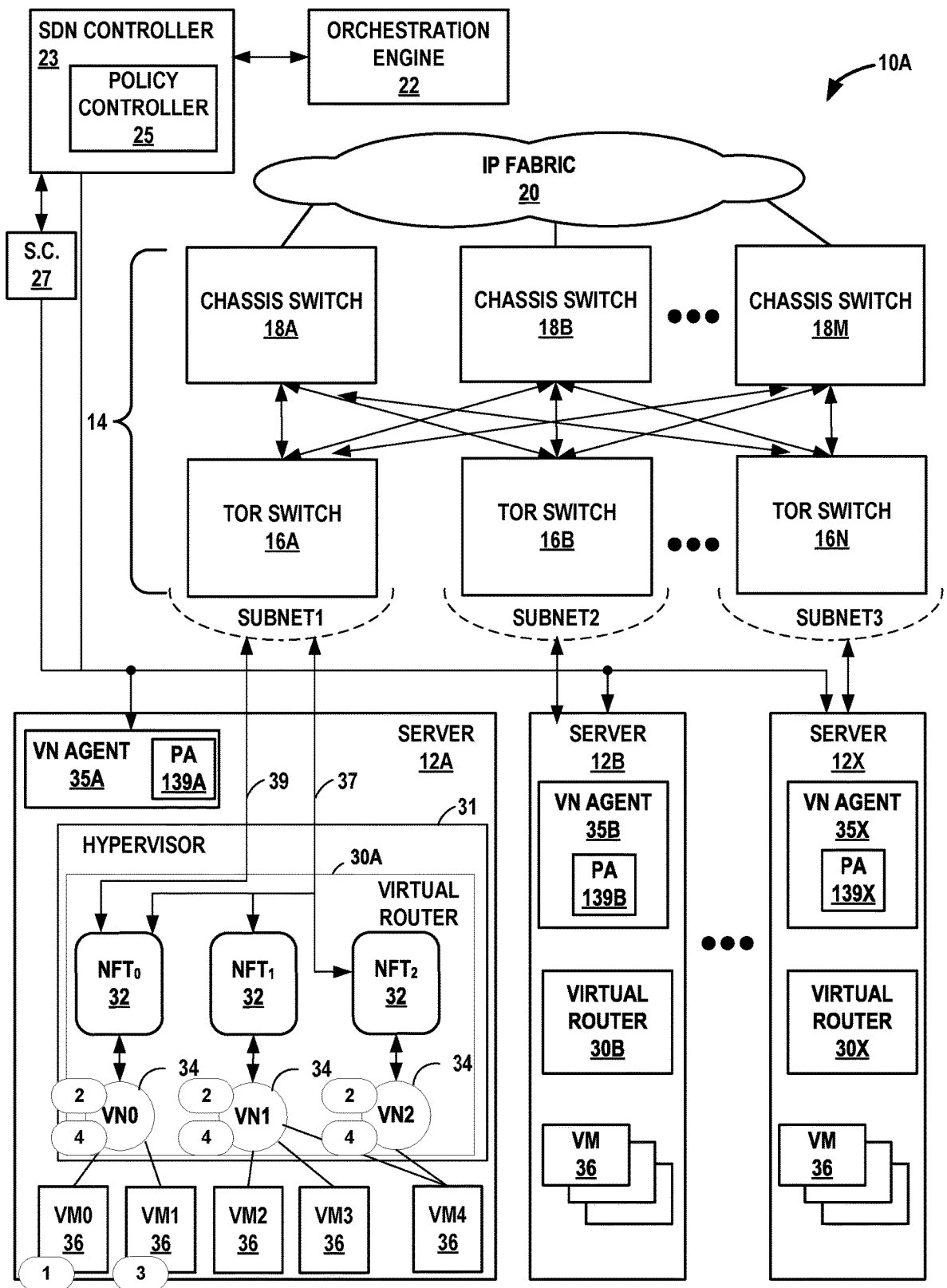
FIG. 2 is a block diagram illustrating an example implementation of the data center of FIG. 1 in further detail.

FIG. 2 is a block diagram illustrating an example implementation of data center 10A of FIG. 1 in further detail. In the example of FIG. 2, virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 12A-12X ("servers 12") on which the application is executing. Each virtual network may use its own addressing and security scheme and may be viewed as orthogonal from the physical network and its addressing scheme. Various techniques may be used to transport packets within and across virtual networks 34 over the physical network.

Each virtual router 30 may execute within a hypervisor, a host operating system or other component of each of servers 12. Each of servers 12 may represent an x86 or other general-purpose or special-purpose server capable of executing virtual machines 36. In the example of FIG. 2, virtual router 30A executes within hypervisor 31, also often referred to as a virtual machine manager (VMM), which provides a virtualization platform that allows multiple operating systems to concurrently run on one of servers 12. In the example of FIG. 2, virtual router 30A manages virtual networks 34 (e.g., VN0-VN2), each of which provides a network environment for execution of one or more virtual machines (VMs) 36 on top of the virtualization platform provided by hypervisor 31. Each VM 36 is associated with one of the virtual networks VN0-VN2 and may represent tenant VMs running customer applications such as Web servers, database servers, enterprise applications, or hosting virtualized services used to create service chains. In some cases, any one or more of servers 12 or another computing device may host customer applications directly, i.e., not as virtual machines. In some cases, some of VMs 36 may represent containers, another form of virtualized execution environment. That is, both virtual machines and container are examples of virtualized execution environments for executing application workloads.

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for an application that differs from the logical address for the underlying, physical computer system, e.g., server 12A in the example of FIG. 1 or 2.

In one implementation, each of servers 12 includes a corresponding one of virtual network (VN) agents 35A-35X (collectively, "VN agents 35") that controls virtual networks 34 and that coordinates the routing of data packets within server 12. In general, each VN agent 35 communicates with virtual SDN controller 23, which generates commands to control routing of packets through data center 10A. VN agents 35 may operate as a proxy for control plane messages between virtual machines 36 and SDN controller 23. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing. In accordance with the techniques of the disclosure, each VN agent 35 further includes a respective policy agent 139A-139X (collectively, policy agents 139") for applying one or more security policies and one or more firewall policies to one or more categories, as will described in more detail below.

In one example, network packets, e.g., layer three (L3) IP packets or layer two (L2) Ethernet packets generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor or the host operating system running on each of servers 12. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10A to create one or more tunnels for interconnecting servers 12. Besides IPinIP, other example tunneling protocols that may be used include IP over GRE, VxLAN, MPLS over GRE, MPLS over UDP, etc.

As noted above, SDN controller 23 provides a logically centralized controller for facilitating operation of one or more virtual networks within data center 10A. SDN controller 23 may, for example, maintain a routing information base, e.g., one or more routing tables that store routing information for the physical network as well as one or more networks of data center 10A. Similarly, switches 16, 18 and virtual routers 30 maintain routing information, such as one or more routing and/or forwarding tables. In one example implementation, virtual router 30A of hypervisor 31 implements a network forwarding table (NFT) 32 for each virtual network 34. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack.

In one or more examples, SDN controller 23 further includes policy controller 25. Policy controller 25 is configured to tag a plurality of objects of virtualized application workloads. In some examples, policy controller 25 tags the plurality of objects across a plurality of categories including applications executing within VMs 36, deployments, application tiers, geographic sites, virtual networks 34, interfaces, projects, security requirements, quality requirements, users, or compliance requirements. In further examples, policy controller 25 tags the plurality of objects across a plurality of levels includes a level of an object, such as a global environment level, a project level, a virtual network level, a virtual machine level, or an interface level of the object.

In some examples, policy controller 25 configures one or more security policies expressed in terms of the tags. Policy controller 25 further distributes, to respective policy agents 139 of VN agents 35, the one or more security policies. Each security policy includes one or more policy rules for controlling network traffic, such as between virtual networks 34 and to redirect traffic to a host-based filter implemented in one of VMs 36. Each policy rule specifies one or more tags, each tag further specifying one or more dimensions of the categories.

Upon receiving the one or more policies, each policy agent 139 applies the one or more policy rules of each of the security policies to tagged objects to control network traffic between the tagged objects. For example, policy agents 139 under the direction of policy controller 25 express the one or more policy rules at VNs 34 and VMs 36 that are tagged. In accordance with the techniques of this disclosure, the one or more policy rules may redirect traffic to a host-based service, such as a host-based filter implemented on one of VMs 36 (e.g., VM4), to utilize functions of a host-based filter (e.g., HBF 11A of FIG. 1) including IPS, IDS, AV, malware detection, and other security functions.

As an illustration of the above, in the example of FIG. 2, policy controller 25 creates security policies for application workloads. For instance, an administrator may use policy controller 25 to tag virtual machine VM0 36 with an application tag 1 (e.g., application=finance), tag virtual network VN0 34 with an application tier tag 2 for a web tier (e.g., tier=web), and tag virtual network VN1 34 with an application tier tag 2 for an application tier (e.g., tier=application). Using the tags, the administrator uses policy controller 25 to configure a security policy for the finance application workload. For example, the administrator may configure a policy for virtual router 30A to direct traffic of a web tier to an application tier of the finance application workload, and to redirect the traffic to the HBF (e.g., https-traffic tier=web→tier=app all traffic to HBF).

Policy controller 25 of SDN controller 23 may push the security policy to policy agent 139A of VN agent 35A to apply the security policies to tagged objects that are members of categories (e.g., tier=web, tier=application) of the application workload to redirect traffic to HBF 11A. For example, policy agent 139A connects virtual networks VN0 34 and VN1 34, and configures virtual router 30A with a tag-to-port mapping to redirect traffic of tagged virtual networks VN0 34 and VN1 34 to interfaces (e.g., input and output interfaces) of VM4 36 that implements the HBF. For example, policy agent 139A configures within virtual router 30A a map of Virtual Routing and Forwarding (VRF) to interfaces of the HBF.

Policy agent 139A may communicate tenant information and the tag-to-port mapping to SDN controller 23, which stores it in a configuration database. As described below, security controller 27 may obtain the tenant information and the tag-to-port mapping from policy controller 25.

The administrator uses security controller 27 to specify a function, e.g., firewall policy, of the HBF implemented on VM4 36 to be applied to traffic of the finance application workload. Security controller 27 may obtain from SDN controller 23 configuration information (e.g., tenants and tags) for an application workload running on servers 12. As one example, security controller 27 may obtain configuration information from SDN controller 23 periodically and/or based on events (e.g., when virtual machines are instantiated). In some examples, security controller 27 may obtain configuration information using a peering session (e.g., BGP) with SDN controller 23.

Security controller 27 may convert the tags to IP addresses for which security functions are to be applied by the HBF, and may push the firewall policies to the HBF. As one example, the administrator may specify the HBF to provide an IPS for HTTPs traffic of the finance application workload. In another example, the administrator may specify the HBF to provide malware protection for HTTP traffic of the finance application workload. Security controller 27 may push the firewall policies, using XMPP or Network Configuration Protocol (NETCONF), for example, to configure the HBF to provide the various functions for traffic of the finance application workload. In this way, the security controller 27 may configure firewall policies expressed in terms of tags that support the finance application workload categorized using one or more tags.

As another example, the administrator may use orchestration engine 22 to tag virtual machine VM1 36 with an application tag 3 (e.g., application=sales), tag virtual network VN0 34 with an application tier tag 4 for a web tier (e.g., tier=web), tag virtual network VN1 34 with an application tier tag 4 for an application tier (e.g., tier=application), and tag virtual network VN2 34 with an application tier tag 4 for a database tier (e.g., tier=database).

Using the tags, policy controller 25 configures a security policy for the sales application workload. For example, the administrator may configure a policy for the sales application workload to direct traffic from a web tier to the application tier, direct traffic from the application tier to the database tier, and to redirect the traffic to the HBF (e.g., https-traffic tier=web→tier=app service SQL traffic to HBF).

Policy controller 25 of SDN controller 23 may push the security policy to policy agent 139A of VN agent 35A to apply the security policies to tagged objects that are members of categories (e.g., tier=web, tier=application, tier=database) of the application workload to redirect traffic to HBF 11A. For example, policy agent 139A connects virtual networks VN0 34-VN2 34, and configures virtual router 30A with a tag-to-port mapping to redirect traffic of tagged virtual networks VN0 34 and VN1 34, from VN1 34 to VN2 34, and redirect the traffic to interfaces (e.g., input and output interfaces) of VM4 36 that implements the HBF. For example, policy agent 139A configures within virtual router 30A a map of Virtual Routing and Forwarding (VRF) to interfaces of the HBF.

Policy agent 139A may communicate tenant information and the tag-to-port mapping to SDN controller 23, which stores it in a configuration database. In examples where there are multiple instances of HBF, the tenant information may include an identifier, such as a virtual local area network (VLAN) identifier to determine the HBF instance for a particular tenant.

Security controller 27 may obtain from SDN controller 23 configuration information (e.g., tenants and tags) for an application workload running on servers 12. As described above, security controller 27 may obtain configuration information from SDN controller 23 periodically, and/or based on events (e.g., when virtual machines are instantiated). In some examples, security controller 27 may obtain configuration using a peering session (e.g., BGP) with SDN controller 23.

Security controller 27 may convert the tags to IP addresses for which security functions are to be applied by the HBF, and may push the firewall policies to the HBF. As one example, the administrator may use security controller 27 to configure the HBF to provide an anti-virus for the IP traffic of the sales application workload. Security controller 27 may push the firewall policies, using XMPP or NETCONF, for example, to configure the HBF to provide the various functions for traffic of the sales application workload. In this way, the security controller 27 may configure firewall policies expressed in terms of tags that support the sales application workload categorized using one or more tags.

Figure 3:
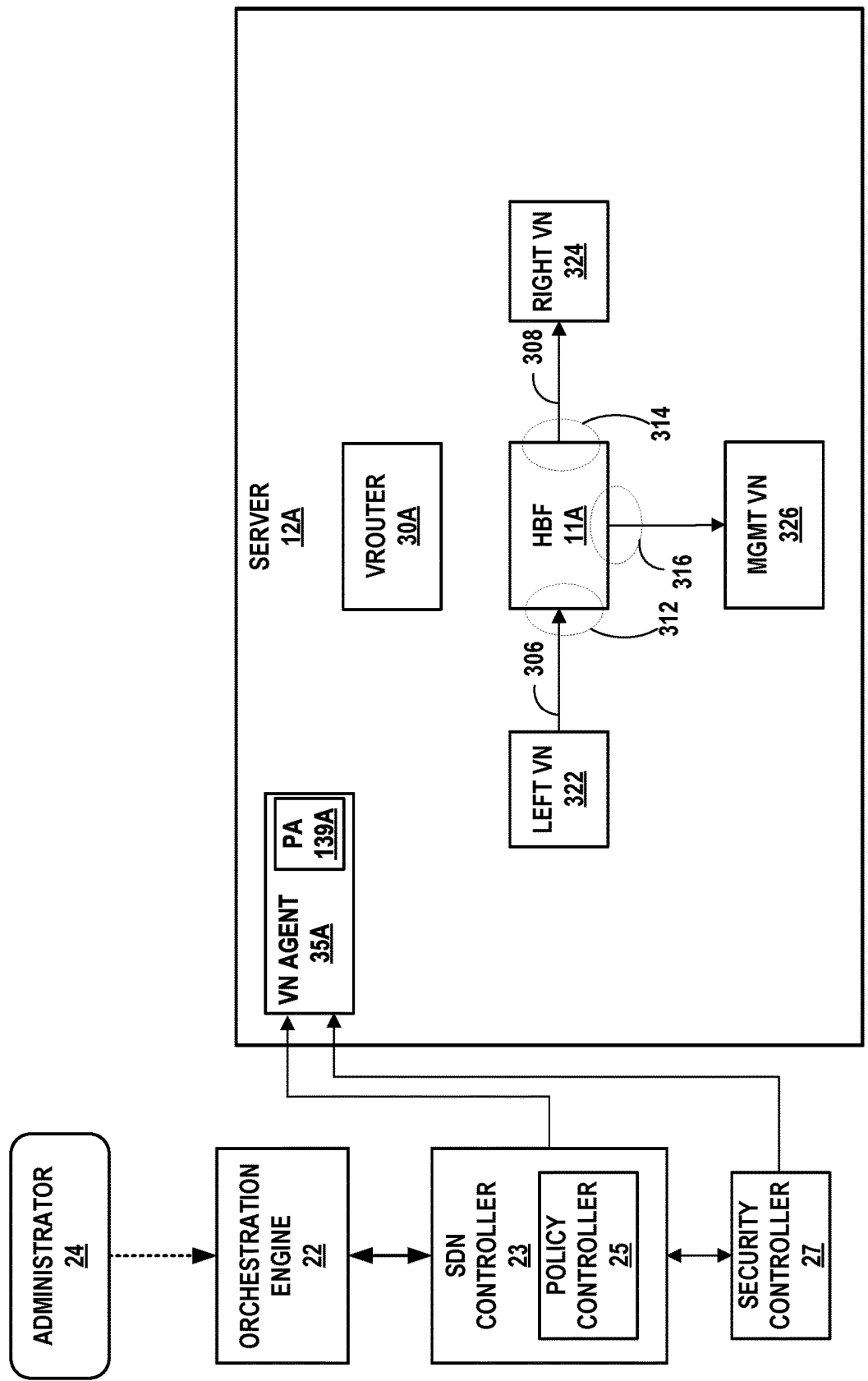
FIG. 3 is a block diagram illustrating an example configuration of a host-based filter, in accordance with the techniques described in this disclosure.

FIG. 3 is a block diagram illustrating an example configuration of a host-based filter, in accordance with the techniques described in this disclosure. In the example of FIG. 3, administrator 24 uses SDN controller 23 to specify a service template used to instantiate HBF 11A. Within the service template, administrator 24 may select a service mode (e.g., routing, transparent, bump-in-the-wire), an image name for the virtual execution element (e.g., VM or container) that implements HBF 11A, and interfaces for HBF 11A. The interfaces may include a left interface 312, a right interface 314, and a management interface 316 of the virtual execution element that implements HBF 11A. The SDN controller 23 pushes the service configuration information to VN agent 35 of server 12A.

VN agent 35A of server 12A receives service configuration information from SDN controller 23 and configures a virtual execution element (e.g., VM or container) and the interfaces of the virtual execution element to implement HBF 11A.

In the example of FIG. 3, VN agent 35A creates a left virtual network 322, a right virtual network 324, and a management virtual network 326 for HBF 11A. Virtual networks 322-324 are used to direct traffic to HBF 11A. VN agent 35A associates the left interface 312 with left virtual network 322, the right interface 314 with right virtual network 324, and the management interface 316 with management network 326.

Policy controller 25 configures one or more security policies to direct traffic between left virtual network 322 and right virtual network 324, and through HBF 11A. As described in this disclosure, the security policies may be expressed in terms of tagged objects. In accordance with the techniques described in this disclosure, policy controller 25 configures one or more security policies expressed in terms of tags to redirect traffic between left virtual network 322 and right virtual network 324 and through HBF 11A. For example, administrator 24 may select the virtual execution element (e.g., VM or container) implementing HBF 11A, select virtual network 322 for the left interface 312, and select virtual network 314 for the right interface 314 to which the security policy applies. Administrator 24 may then associate the security policy with left virtual network 322 and right virtual network 324 to which the security policy applies. In this way, HBF 11A may be provided as part of an intra-network service chain.

Administrator 24 (or another user) may use security controller 27 to configure firewall policies for HBF 11A. As described above, security controller 27 may obtain the tenant information and associated tags from SDN controller 23. Security controller 27 may convert the tags to IP addresses for which security functions are to be applied by the HBF. In this way, an administrator 24 may use security controller 27 to specify functions of HBF 11A, such as Intrusion Prevention Systems (IPS), Intrusion Detection Systems (IDS), anti-virus (AV), malware detection, and other security functions to be applied to tagged objects of application workloads. Security controller 27 may use a configuration protocol, such as XMPP or NETCONF to communicate with a management interface 316 of HBF 11A to configure HBF 11A to provide the specified security functions.

Figure 4:
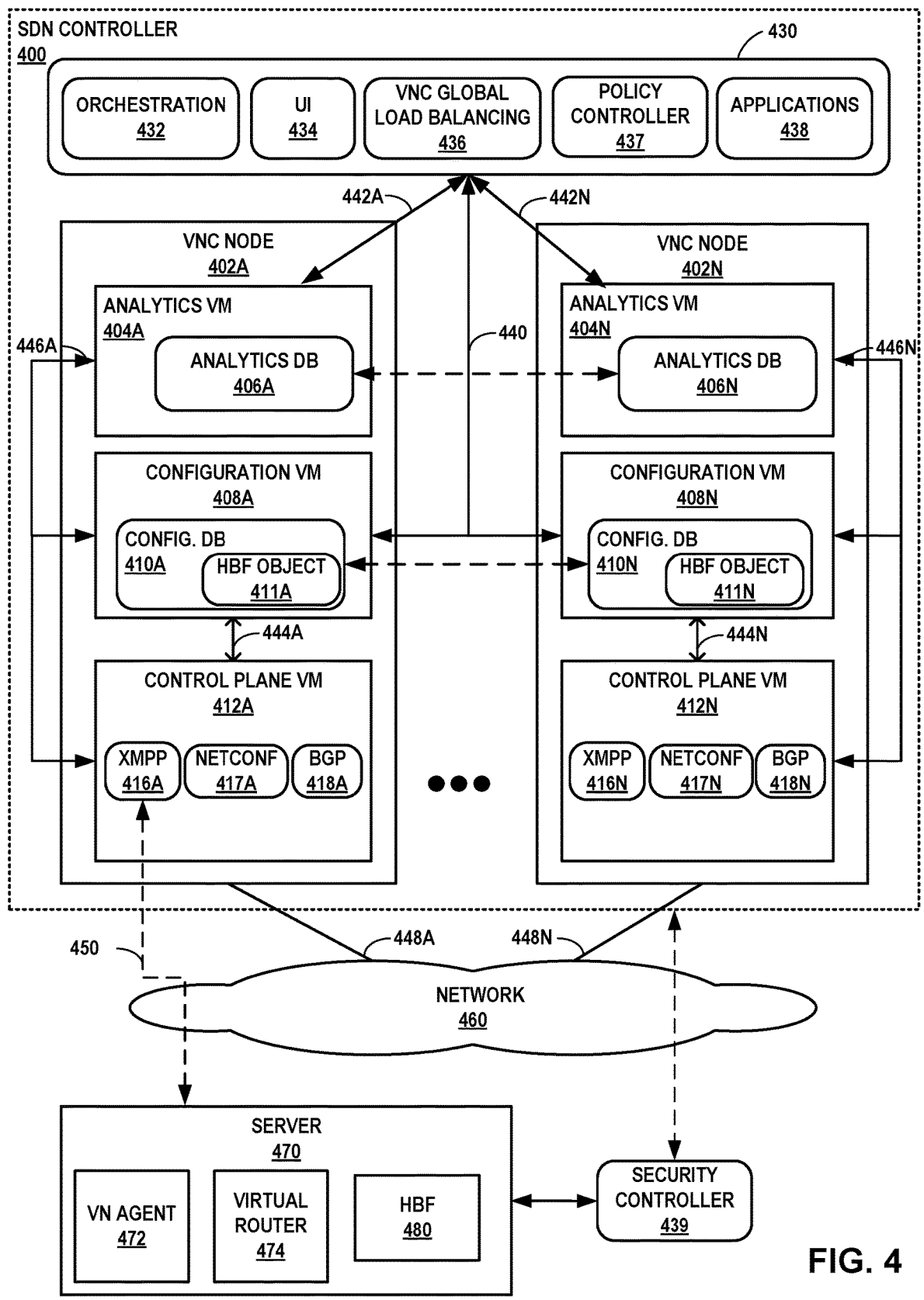
FIG. 4 illustrates an example controller operating according to techniques described in this disclosure.

FIG. 4 illustrates an example controller operating according to techniques described in this disclosure. SDN controller 400 may represent an example instance of SDN controller 23 of FIGS. 1-3. Although illustrated and described as a physically distributed and "virtual" network controller, some examples of VNC 400 may be both physically and logically centralized within an appliance or server.

As illustrated in the example of FIG. 4, virtual network controller (VNC) 400 includes one or more virtual network controller ("VNC") nodes 402A-402N (collectively, "VNC nodes 402") to execute the functionality of an SDN controller, including managing the operation of virtual routers for one or more virtual networks implemented within the data center. Each of VNC nodes 402 may represent a different network device of the data center, e.g., servers 12 of FIG. 1-3. In some instances, some of VNC nodes 402 may execute as separate virtual machines on the same network device.

Each of VNC nodes 402 may control a different, non-overlapping set of data center elements, such as network devices, individual virtual routers executing within network devices, individual interfaces associated with virtual routers, chassis switches, TOR switches, and/or communication links. VNC nodes 402 peer with one another according to a peering protocol operating over network 460. Network 460 may represent an example instance of switch fabric 14 and/or IP fabric 20 of FIG. 1. In the illustrated example, VNC nodes 402 peer with one another using a Border Gateway Protocol (BGP) implementation, an example of a peering protocol. In this sense, VNC nodes 402A and 302N may represent a first controller node device and a second controller node device, respectively, peered using a peering protocol. VNC nodes 402 include respective network discovery modules 414-414N to discover network elements of network 460.

VNC nodes 402 provide, to one another using the peering protocol, information related to respective elements of the virtual network managed, at least in part, by the VNC nodes 402. For example, VNC node 402A may manage a first set of one or more network devices operating as virtual routers for the virtual network. VNC node 402A may send information relating to the management or operation of the first set of network devices to VNC node 402N by BGP 418A. Other elements managed by VNC nodes 402 may include network controllers and/or appliances, network infrastructure devices (e.g., L2 or L3 switches), communication links, firewalls, and VNC nodes 402 for example. Because VNC nodes 402 have a peer relationship, rather than a master-slave relationship, information may be sufficiently easily shared among the VNC nodes 402. In addition, hardware and/or software of VNC nodes 402 may be sufficiently easily replaced, providing satisfactory resource fungibility.

SDN controller 400 may perform any one or more of the illustrated virtual network controller operations represented by modules 430, which may include orchestration 432, user interface 434, VNC global load balancing 436, and one or more applications 438. SDN controller 400 executes orchestration module 432 to facilitate the operation of one or more virtual networks in response to a dynamic demand environment by, e.g., spawning/removing virtual machines in data center network devices, adjusting computing capabilities, allocating network storage resources, and modifying a virtual topology connecting virtual routers of a virtual network. VNC global load balancing 436 executed by SDN controller 400 supports load balancing of analytics, configuration, communication tasks, e.g., among VNC nodes 402. Applications 438 may represent one or more network applications executed by VN nodes 402 to, e.g., change topology of physical and/or virtual networks, add services (e.g., adding an HBF), or affect packet forwarding.

User interface 434 includes an interface usable by an administrator (or software agent) to control the operation of VNC nodes 402. For instance, user interface 434 may include methods by which an administrator may modify, e.g. configuration database 410A of VNC node 402A. Administration of the one or more virtual networks operated by SDN controller 400A may proceed by uniform user interface 434 that provides a single point of administration, which may reduce an administration cost of the one or more virtual networks.

Each of VNC nodes 402 may include substantially similar components for performing substantially similar functionality, said functionality being described hereinafter primarily with respect to VNC node 402A. VNC node 402A may include a control plane virtual machine (VM) 412A that executes control plane protocols to facilitate the distributed VNC techniques. Control plane VM 312A may in some instances represent a native process. Control VM 312A executes BGP 318A to provide information related to the first set of elements managed by VNC node 402A to, e.g., control plane virtual machine 412N of VNC node 402N. Control plane VM 412A may use an open standards based protocol (e.g., BGP based L3VPN) to distribute information about its virtual network(s) with other control plane instances and/or other third party networking equipment(s). Given the peering based model according to one or more aspects described herein, different control plane instances (e.g., different instances of control plane VMs 412A-412N) may execute different software versions. In one or more aspects, e.g., control plane VM 412A may include a type of software of a particular version, and the control plane VM 412N may include a different version of the same type of software. The peering configuration of the control node devices may enable use of different software versions for the control plane VMs 412A-412N. The execution of multiple control plane VMs by respective VNC nodes 402 may prevent the emergence of a single point of failure.

Control plane VM 412A communicates with virtual routers, e.g., illustrated virtual router 474 executed by server 470, using a communication protocol operating over network 460. Server 470 may represent an example instance of server 12 of FIGS. 1-3. Virtual routers facilitate overlay networks in the one or more virtual networks. In the illustrated example, control plane VM 412A uses eXtensible Messaging and Presence Protocol (XMPP) 416A to communicate with at least virtual router 474 by XMPP interface 450. Virtual router data, statistics collection, logs, and configuration information may in accordance with XMPP 416A be sent as XML documents for communication between control plane VM 412A and the virtual routers. Control plane VM 412A may in turn route data to other XMPP servers (such as an analytics collector) or may retrieve configuration information on behalf of one or more virtual routers. Control plane VM 412A may further execute a communication interface 444A for communicating with configuration virtual machine (VM) 408A associated with configuration database 410A. Communication interface 444A may represent an IF-MAP interface.

VNC node 402A may include configuration VM 408A to store configuration information for the first set of elements in configuration database 410A. Configuration VM 408A, although described as a virtual machine, may in some aspects represent a native process executing on an operating system of VNC node 402A. Configuration database 410A may store configuration information related to a first set of elements managed by VNC node 402A. For example, configuration database 410A may store contents of a high-level data model (e.g., the configuration state that was explicitly installed by the provisioning system) and contents of a low-level data model (e.g., the configuration state derived from the high-level data model). Control plane components of VNC node 402A may store configuration information to configuration database 410A using interface 444A, which may represent an Interface for Metadata Access Points (IF-MAP) protocol implementation. VNC node 402A may share at least some configuration information related to one or more of the first set of elements managed by VNC node 402A and stored in configuration database 410A, as well as to receive at least some configuration information related to any of the elements managed by others of VNC nodes 402. Configuration database 410A may represent a distributed hash table (DHT), for instance, or any suitable data structure for storing configuration information for network elements in a distributed manner in cooperation with others of VNC nodes 402. Configuration VM 408A and control plane VM 412A may communicate using IF-MAP by communication interface 444A and using XMPP by communication interface 446A. In some aspects, configuration VM 408A may include a horizontally scalable multi-tenant IF-MAP server and a distributed hash table (DHT)-based IF-MAP database that represents configuration database 410A. In some aspects, configuration VM 408A may include a configuration translator, which may translate a user friendly higher-level virtual network configuration to a standards based protocol configuration (e.g., a BGP L3VPN configuration), which may be stored using configuration database 410A.

Communication interface 440 may include an IF-MAP interface for communicating with
other network elements. The use of the IF-MAP may make the storage and management of virtual network configurations very flexible and extensible given that the IF-MAP schema can be
dynamically updated. Advantageously, aspects of SDN controller 400 may be flexible for new
applications 438.

VNC node 402A may further include an analytics virtual machine (VM) 404A to store
diagnostic information (and/or visibility information) related to at least the first set of elements
managed by VNC node 402A. Control plane VM 412 and analytics VM 404 may communicate
using an XMPP implementation by communication interface 446A. Analytics VM 404A, although described as a virtual machine, may in some aspects represent a native process executing on an operating system of VNC node 402A.

VNC node 402A may include an analytics database 406A for storing diagnostic information related to a first set of elements managed by VNC node 402A. VNC node 402A may share at least some diagnostic information related to one or more of the first set of elements managed by VNC node 402A and stored in analytics database 406, as well as to receive at least some diagnostic information related to any of the elements managed by others of VNC nodes 402. Analytics database 406A may represent a distributed hash table (DHT), for instance, or any suitable data structure for storing diagnostic information for network elements in a distributed manner in cooperation with others of VNC nodes 402. The distributed database may include an XMPP interface on a first side and a REST/JSON/XMPP interface on a second side.

Virtual router 474 may implement the layer 3 forwarding and policy enforcement point
for one or more end points and/or one or more hosts. The one or more end points and/or one or more hosts may be classified into a virtual network due to configuration from control plane VM 412A. Control plane VM 412A may also distribute virtual-to-physical mapping for each end point to all other end points as routes. These routes may give the next hop mapping virtual IP to physical IP and encapsulation technique used (e.g., one of IPinIP, NVGRE, VXLAN, etc.). Virtual router 474 may be agnostic to actual tunneling encapsulation used. Virtual router 474 may also trap interesting layer 2 (L2) packets, broadcast packets, and/or implement proxy for the packets, e.g. using one of Address Resolution Protocol (ARP), Dynamic Host Configuration
Protocol (DHCP), Domain Name Service (DNS), etc. Virtual router 474 may also facilitate an intra-network service chain between virtual networks and through an HBF, e.g., HBF 480, as described in this disclosure.

In accordance with the techniques described in this disclosure, an administrator may create, for example, a project for an application workload using orchestration module 432 via user interface 434. SDN controller 400 stores the project in configuration database 410A. The administrator then creates configuration objects of a high-level data model for the project, such as such as host-based firewall 11A described in the examples of FIGS. 1-3, using orchestration module 432. The objects for HBFs (illustrated in FIG. 4 as HBF objects 411A-411N) are stored in configuration databases 410.

VNC node 402A may share configuration information related to HBF objects 411 that are stored in configuration databases 410. For example, control plane VM 412A may execute a communication interface 444A for communicating with configuration VM 408A to obtain configuration information stored in configuration database 410A, such as configuration information related to HBF object 411A. Control plane VM 412A may use XMPP 416A to communicate the configuration information related to HBF object 411A to VN agent 472 of server 470. VN agent 472 uses the configuration information related to HBF object 411A to instantiate HBF object 411A within server 470. For example, VN agent 472 may instantiate HBF object 411A on a virtual execution element (e.g., virtual machine or container) of server 470, represented as HBF 480.

The administrator may configure a security policy to redirect traffic to the HBF, e.g., HBF 480. For example, the administrator may configure a security policy expressed in terms of one or more tags that categorize one or more objects of a data model for the application workload to control network traffic between the tagged objects. The administrator uses user interface 434 to create and manage the one or more tags. The tagged objects are stored in configuration database 410A. The administrator may configure a security policy expressed as tagged objects via policy controller 437. As described above, the administrator may configure a security policy that redirects traffic from virtual networks of server 470 to HBF 480.

The administrator may also use security controller 439 to create and manage firewall policies of HBF 480. Although security controller 439 is illustrated as a separate controller (e.g., for controllers that manage third-party host-based services), security controller 439 may in some instances be included in modules 430 of SDN controller 400.

In the example of FIG. 4, the administrator may use security controller 439 to configure a firewall policy that specifies the function in which HBF 480 is to apply to network traffic of application workloads hosted on server 470. For example, security controller 439 may obtain the configuration information for an application workload running on server 470. Configuration information may include tenant information, virtual networks, virtual machines associated with the virtual networks, and/or the associated tags. As one example, SDN controller 400 may, in response to configuring a VM for an application workload, generate a User Visible Entity (UVE) towards analytics VM 404A, which may access the configuration information stored in configuration database 410A. A user may access or subscribe to the UVE to obtain configuration information of an application workload, such as the virtual networks, virtual machines that belong to the virtual networks, associated tags, and/or IP addresses associated with the VMs. As one example, security controller 439 may use an application programming interface (API) to obtain the configuration information from SDN controller 400. Security controller 439 may periodically obtain the configuration information, or obtain the configuration based on an event (e.g., when VMs of an application workload is instantiated). In some examples, security controller 439 may use a peering session, e.g., BGP, to communicate with SDN controller 400.

Security controller 439 may convert the tags to IP addresses for which security functions are to be applied by HBF 480, and may push the firewall policies to HBF 480. The administrator may then use security controller 439 to create and manage firewall policies to be configured on HBF 480. Security controller 439 may use a configuration protocol, such as XMPP or NETCONF, to communicate with a management interface of HBF 480 using Network Configuration Protocol (NETCONF) or other configuration protocols.

Figure 5:
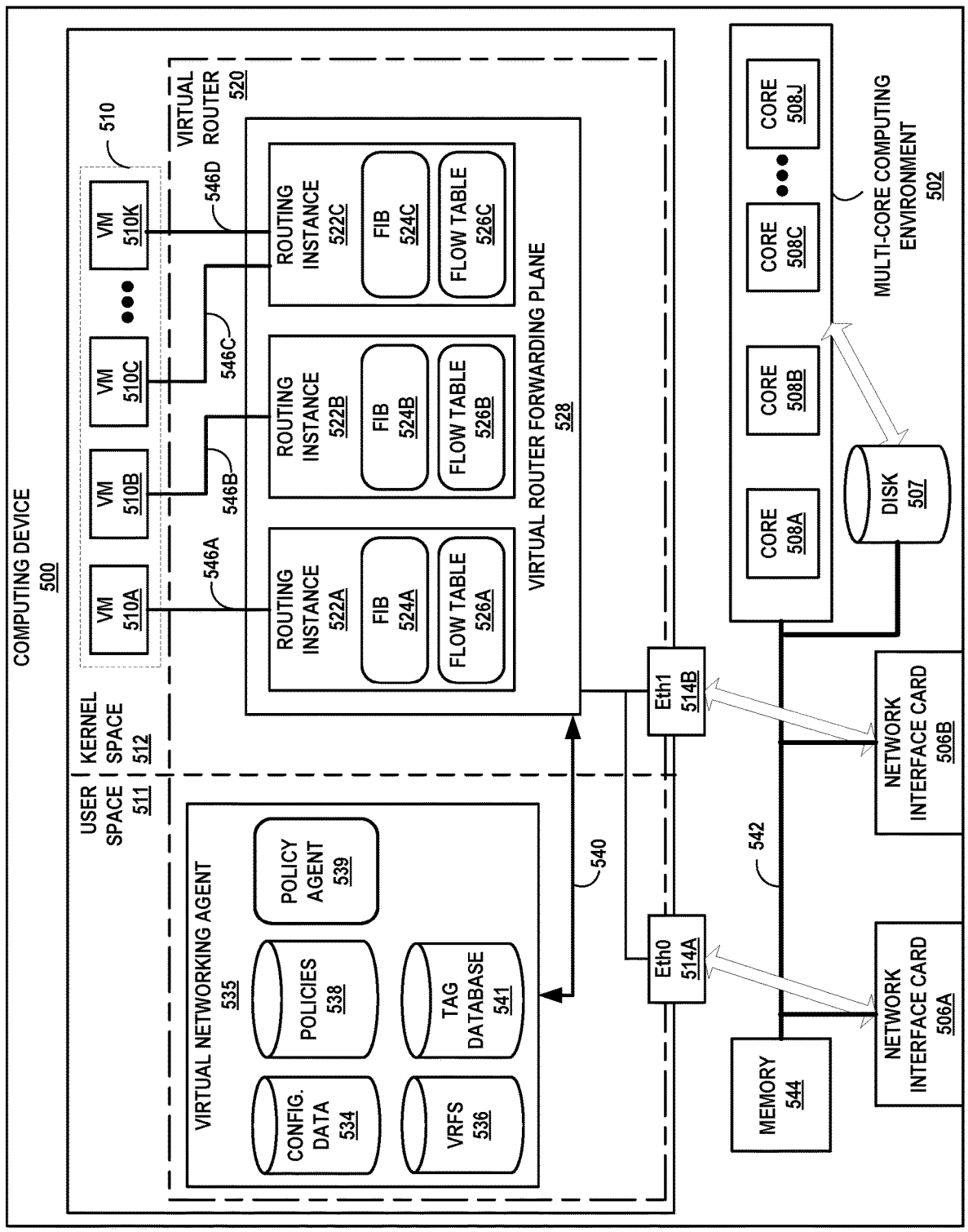
FIG. 5 is a block diagram illustrating an example computing device, in accordance with the techniques described in this disclosure.

FIG. 5 is a block diagram illustrating an example computing device, in accordance with the techniques described in this disclosure. Computing device 500 may represent an example instance of any of servers 12 of FIGS. 1-3 and server 470 of FIG. 4.

Computing device 500 includes in this example a system bus 542 coupling hardware components of a computing device 100 hardware environment. System bus 542 couples memory 544, network interface cards (NICs) 506A-506B (collectively, "NICs 506"), storage disk 507, and multi-core computing environment 502 having a plurality of processing cores 508A-508J (collectively, "processing cores 508"). Network interface cards 506 include interfaces configured to exchange packets using links of an underlying physical network.

Multi-core computing environment 502 may include any number of processors and any number of hardware cores. Each of processing cores 508 each includes an independent execution unit to perform instructions that conform to an instruction set architecture for the core. Processing cores 508 may each be implemented as separate integrated circuits (ICs) or may be combined within one or more multi-core processors (or "many-core" processors) that are each implemented using a single IC (i.e., a chip multiprocessor).

Disk 507 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 508.

Main memory 544 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 544 provides a physical address space composed of addressable memory locations.

Memory 544 may in some examples present a non-uniform memory access (NUMA) architecture to multi-core computing environment 502. That is, cores 508 may not have equal memory access time to the various storage media that constitute memory 544. Cores 508 may be configured in some instances to use the portions of memory 544 that offer the lowest memory latency for the cores to reduce overall memory latency.

In some instances, a physical address space for a computer-readable storage medium may be shared among one or more cores 508 (i.e., a shared memory). For example, cores 508A, 508B may be connected via a memory bus (not shown) to one or more DRAM packages, modules, and/or chips (also not shown) that present a physical address space accessible by cores 508A, 508B. While this physical address space may offer the lowest memory access time to cores 508A, 508B of any of portions of memory 544, at least some of the remaining portions of memory 544 may be directly accessible to cores 508A, 508B. One or more of cores 508 may also include an L1/L2/L3 cache or a combination thereof. The respective caches for cores 508 offer the lowest-latency memory access of any of storage media for the cores 508.

Memory 544, network interface cards (NICs) 506A-506B (collectively, "NICs 506"), storage disk 507, and multi-core computing environment 502 provide an operating environment for a software stack that executes a virtual router 520 and one or more virtual machines 510A-510K (collectively, "virtual machines 510"). Virtual router 520 may represent example instances of any of virtual routers 30 of FIGS. 2-3 or virtual router 474 of FIG. 4. Virtual machines 510 may represent example instances of any of virtual machines 36 of FIG. 2. The computing device 500 partitions the virtual and/or physical address space provided by main memory 544 and in the case of virtual memory by disk 507 into user space 511, allocated for running user processes, and kernel space 512, which is protected and generally inaccessible by user processes. An operating system kernel (not shown in FIG. 5) may execute in kernel space and may include, for example, a Linux, Berkeley Software Distribution (BSD), another Unix-variant kernel, or a Windows server operating system kernel, available from Microsoft Corp. Computing device 500 may in some instances execute a hypervisor to manage virtual machines 510 (also not shown in FIG. 5). An example hypervisor 31 is illustrated in FIG. 2. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information such as FIBs 524 may execute the virtual router 520.

Eth0 114A and Eth1 514B represent devices according to a software device model and provide device driver software routines for handling packets for receipt/transmission by corresponding NICs 506. Packets received by NICs 506 from the underlying physical network fabric for the virtual networks may include an outer header to allow the physical network fabric to tunnel the payload or "inner packet" to a physical network address for one of NICs 506. The outer header may include not only the physical network address but also a virtual network identifier such as a VxLAN tag or Multiprotocol Label Switching (MPLS) label that identifies one of the virtual networks as well as the corresponding routing instance 522. An inner packet includes an inner header having a destination network address that conform to the virtual network addressing space for the virtual network identified by the virtual network identifier. For example, virtual router forwarding plane 528 may receive by Eth1 from NIC 506 a packet having an outer header than includes a VxLAN associated in virtual router forwarding plane 528 with routing instance 522A. The packet may have an inner header having a destination network address that is a destination address of VM 510A that taps, via tap interface 546A, into routing instance 522A.

Virtual router 520 in this example includes a kernel space 512 module: virtual router forwarding plane 528, as well as a user space 511 module: VN agent 535. Virtual router forwarding plane 528 executes the "forwarding plane" or packet forwarding functionality of the virtual router 520 and VN agent 535 executes the "control plane" functionality of the virtual router 520. VN agent 535 may represent an example instance of any of VN agents 35 of FIG. 2-3 and VN agent 472 of FIG. 4.

Virtual router forwarding plane 528 includes multiple routing instances 522A-522C (collectively, "routing instances 522") for corresponding virtual networks. Each of routing instances 522 includes a corresponding one of forwarding information bases (FIBs) 524A-524C (collectively, "FIBs 524") and flow tables 526A-526C (collectively, "flow tables 526"). Although illustrated as separate data structures, flow tables 526 may in some instances be logical tables implemented as a single table or other associative data structure in which entries for respective flow tables 526 are identifiable by the virtual network identifier (e.g., a VRF identifier such as VxLAN tag or MPLS label)). FIBs 524 include lookup tables that map destination addresses to destination next hops. The destination addresses may include layer 3 network prefixes or layer 2 MAC addresses. Flow tables 526 enable application of forwarding policies to flows. Each of flow tables 526 includes flow table entries that each match one or more flows that may traverse virtual router forwarding plane 528 and include a forwarding policy for application to matching flows. For example, virtual router forwarding plane 528 attempts to match packets processed by routing instance 522A to one of the flow table entries of flow table 526A. If a matching flow table entry exists for a given packet, virtual router forwarding plane 528 applies the flow actions specified in a policy to the packet. This may be referred to as "fast-path" packet processing. If a matching flow table entry does not exist for the packet, the packet may represent an initial packet for a new packet flow and virtual router forwarding plane 528 may request VN agent 535 to install a flow table entry in the flow table for the new packet flow. This may be referred to as "slow-path" packet processing for initial packets of packet flows and is represented in FIG. 5 by slow path 540.

In this example, VN agent 535 may be a user space 511 process executed by computing device 500. VN agent 535 includes configuration data 534, virtual routing and forwarding instances configurations 536 ("VRFs 536"), and policy table 538 ("policies 538"). VN agent 535 exchanges control information with one or more SDN controllers (e.g., SDN controller 23 of FIGS. 1-3). Control information may include, virtual network routes, low-level configuration state such as routing instances and forwarding policy for installation to configuration data 534, VRFs 536, and policies 538. VN agent 535 may also report analytics state, install forwarding state to FIBs 524 of virtual router forwarding plane 528, discover VMs 510 and attributes thereof. As noted above, VN agent 535 further applies slow-path packet processing for the first (initial) packet of each new flow traversing virtual router forwarding plane 528 and installs corresponding flow entries to flow tables 526 for the new flows for fast path processing by virtual router forwarding plane 528 for subsequent packets of the flows.

VN agent 35 further includes tag database 541. As described above, policy controller 25 of SDN controller 23 assigns one or more tags specifying one or more categories for the objects (and in some instance one or more levels). Policy controller 25 may apply tags to objects across a plurality of categories (as well as apply the tags to objects across a plurality of levels and/or data centers). Policy controller 25 distributes these tags to VN agent 535, which stores the assigned tags in tag database 541.

As one example, an administrator may use policy controller 25 may apply tags to projects, virtual machines, virtual networks, virtual machine interfaces (e.g., ports) of computing devices, including computing device 500, that indicate whether the tagged objects are to redirect network traffic to a host-based firewall. Policy agent 539 of VN agent 535 may receive the tags from policy controller 25 and store the tags in tag database 541.

The administrator may also use policy controller 25 to create one or more policies expressed in terms of the tags to control network traffic between tagged objects. Policy agent 539 receives, from policy controller 25, the one or more security policies and stores such policies in policies 538. Each of policies 538 may include one or more policy rules that specify whether to redirect network traffic to a HBF.

The administrator (or another user) may use security controller 27 to create one or more firewall policies for the HBF. The HBF receives, via a management interface of the HBF and from a security controller 27, the one or more firewall policies. Each of these policies may include one or more functions of HBF instances for an application workload.

Each security policy and firewall policy may include one or more tags that specify to which objects, such as types of application workloads executing on VMs 510, the policies apply. For example, policy agent 539 may cross reference the one or more tags of the security policy and firewall policy with one or more tags in tag database 541 to determine one or more objects to which the security policy and firewall policy should be applied. Upon determining the one or more objects to which the security policy and firewall policy should be applied, policy agent 139 redirects network traffic to the HBF from one or more tagged objects in accordance with the security policy, and the HBF applies a function of the HBF in accordance with the firewall policy.

Figure 6:
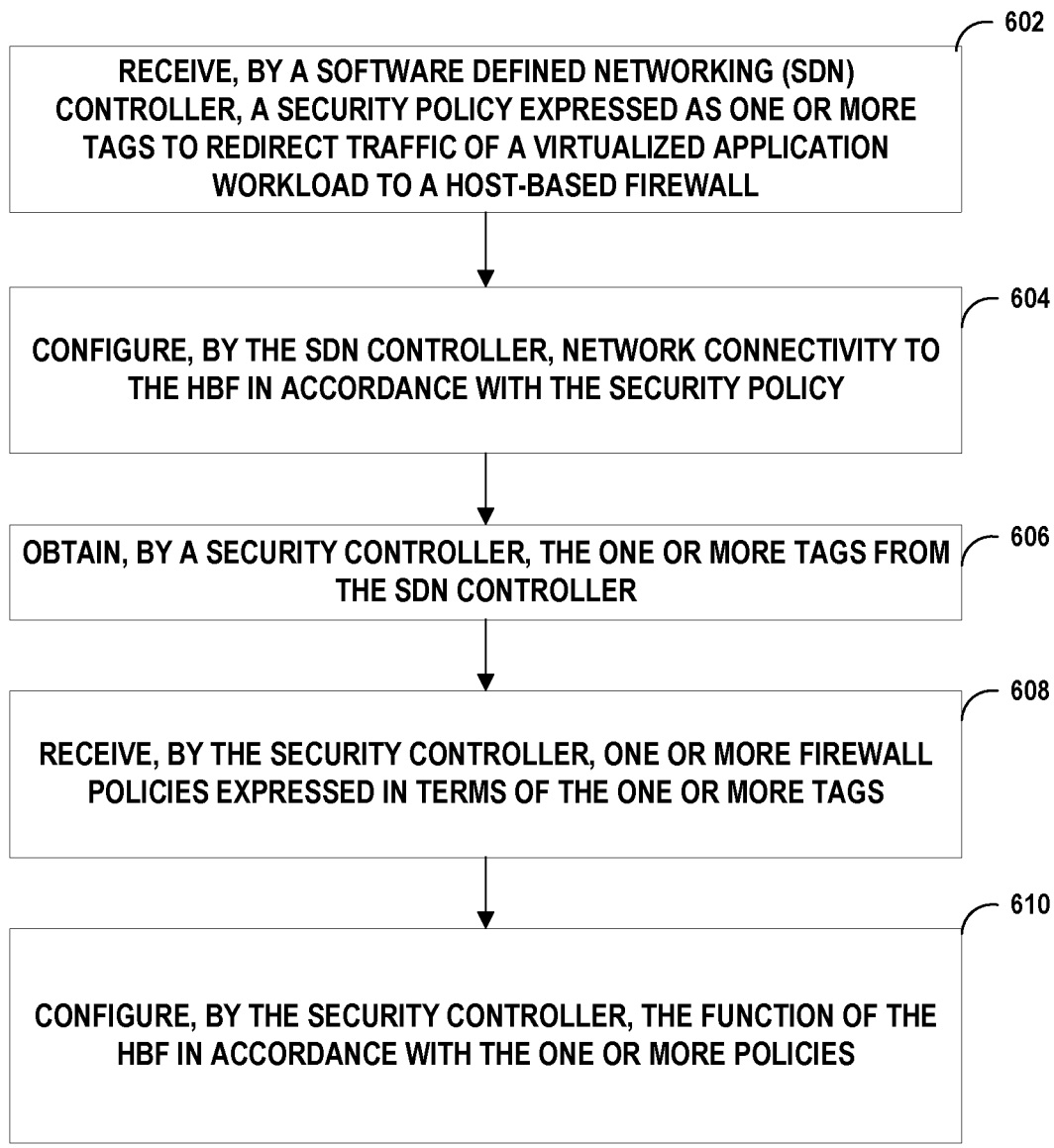
FIG. 6 is a flowchart illustrating an example operation in accordance with the techniques of the disclosure.

FIG. 6 is a flowchart illustrating an example operation in accordance with the techniques of the disclosure. For convenience, FIG. 6 is described with respect to FIGS. 1 and 2.

In the example of FIG. 6, SDN controller 23 receives a security policy expressed as one or more tags to redirect traffic of a virtualized application workload to a host-based firewall (HBF) of the multi-tenant virtualized data center (602). For example, a user may use policy controller 25 of SDN controller 23 to define a security policy expressed in terms of one or more tags. The SDN controller 23 configures network connectivity to HBF 11A in accordance with the security policy (604). For example, policy controller 25 of SDN controller 23 may push the security policy to policy agent 139A of VN agent 35A to apply the security policies to tagged objects that are members of categories of the application workload to redirect traffic to HBF 11A. Based on the policy rule, policy agent 139A maps the tags to ports of VM4 36 that implements the HBF to redirect traffic to the HBF.

In some examples, policy agent 139A may communicate tenant information and the tag-to-port mapping to SDN controller 23, which stores it in a configuration database. Security controller 27 may obtain the one or more tags from SDN controller 23 (606). For example, security controller 27 may use BGP to obtain the tenant information and the tag-to-port mapping from policy controller 25 of SDN controller 23.

Security controller 27 may receive one or more firewall policies expressed in terms of the one or more tags (608). For example, the administrator may use security controller 27 to configure the HBF to provide functions for various traffic types of the application workload. As one example, the administrator may specify HBF 11A to provide an IPS for HTTPs traffic of the finance application workload. In another example, the administrator may specify HBF 11A to provide malware protection for HTTP traffic of the finance application workload. Security controller 27 may push the firewall policies, using XMPP or NETCONF, for example, to a management interface of the HBF to configure the HBF to provide the various functions of HBF 11A in accordance with the one or more firewall policies (610). As one example, HBF 11A receives, from security controller 27, a first firewall policy to implement an IPS that blocks malicious HTTPs network traffic of a finance application workload. HBF 11A is then configured to apply the IPS, which may, for example, perform signature-based detection and statistical anomaly-based detection mechanisms of an IPS to traffic of the finance application workload.

As another example, HBF 11A receives, from security controller 27, a second firewall policy to implement malware protection for HTTP traffic of the finance application workload. HBF 11A is then configured to apply the malware protection, which may, for example, perform signature-based detection using a database of known malware definitions to scan for malware. When HBF 11A detects a file that matches the malware signature, the malware protection may flag, quarantine, or remove the potential malware.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by a software defined networking (SDN) controller of a multi-tenant virtualized data center, a security policy expressed as one or more tags to redirect traffic of a virtualized application workload to a host-based firewall of the multi-tenant virtualized data center;
configuring, by the SDN controller, a virtual router to direct traffic of the virtualized application workload to the host-based firewall in accordance with the security policy;
obtaining, by a security controller that manages the host-based firewall, the one or more tags from the SDN controller;
receiving, by the security controller, one or more firewall policies expressed in terms of the one or more tags, wherein each of the one or more firewall policies specifies a function of the host-based firewall; and
configuring, by the security controller, the function of the host-based firewall in accordance with the one or more firewall policies.

2. The method of claim 1, wherein the function of the host-based firewall comprises at least one of Intrusion Prevention System, Intrusion Detection System, anti-virus, and malware detection.

3. The method of claim 1, further comprising:
configuring, by the SDN controller, a virtual execution element of a server of the multi-tenant virtualized data center to implement the host-based firewall.

4. The method of claim 3, wherein the virtual execution element comprises a virtual machine of the multi-tenant virtualized data center.

5. The method of claim 3, wherein the virtual execution element comprises a container of a server of the multi-tenant virtualized data center.

6. The method of claim 1, further comprising:
obtaining, by the security controller, a virtual local area network (VLAN) identifier for one or more tenants of the multi-tenant virtualized data center; and
configuring, by the security controller, an instance of the host-based firewall for each of the one or more tenants of the multi-tenant virtualized data center,
wherein configuring the function of the host-based firewall in accordance with the one or more firewall policies further comprises configuring the one or more firewall policies using the one or more tags and the VLAN identifier for the one or more tenants of the multi-tenant virtualized data center.

7. The method of claim 1, further comprising:
receiving, by the SDN controller, a request to create a project for the virtualized application workload to use the host-based firewall;
generating, by the SDN controller, a host-based firewall object to be specified in the security policy;
in response to generating the host-based firewall object, configuring, by the SDN controller, a left interface, a right interface, and a management interface for a virtual execution element implementing the host-based firewall;
configuring, by the SDN controller, a left virtual network, a right virtual network, and a management network for the virtual execution element implementing the host-based firewall;
associating, by the SDN controller, the left interface with the left virtual network;
associating, by the SDN controller, the right interface with the right virtual network; and
associating, by the SDN controller, the management interface with the management virtual network,
wherein configuring network connectivity to the host-based firewall in accordance with the security policy comprises configuring network connectivity to the left virtual network and the right virtual network for the virtual execution element implementing the host-based firewall.

8. The method of claim 1, further comprising:
in response to obtaining the one or more tags from the SDN controller, converting, by the security controller, the tags to IP addresses,
wherein, to configure the function of the host-based firewall in accordance with the one or more firewall policies, the security controller is configured to configure the function of the host-based firewall based on the IP addresses.

9. A system comprising:
a software defined networking (SDN) controller of a multi-tenant virtualized data center, the SDN controller configured to:
receive a security policy expressed as one or more tags to redirect traffic of a virtualized application workload to a host-based firewall of the multi-tenant virtualized data center; and
configure network connectivity to the host-based firewall in accordance with the security policy; and
a security controller that manages the host-based firewall, the security controller configured to:
obtain the one or more tags from the SDN controller;
receive one or more firewall policies expressed in terms of the one or more tags, wherein each of the one or more firewall policies specifies a function of the host-based firewall; and
configure the function of the host-based firewall in accordance with the one or more firewall policies.

10. The system of claim 9, wherein the function of the host-based firewall comprises at least one of Intrusion Prevention System, Intrusion Detection System, anti-virus, and malware detection.

11. The system of claim 9, further comprising:
a virtual execution element of a server of the multi-tenant virtualized data center, the virtual execution element implemented as the host-based firewall.

12. The system of claim 11, wherein the virtual execution element comprises a virtual machine of the multi-tenant virtualized data center.

13. The system of claim 11, wherein the virtual execution element comprises a container of a server of the multi-tenant virtualized data center.

14. The system of claim 9, wherein the security controller is further configured to:
obtain an identifier for one or more tenants of the multi-tenant virtualized data center; and
configure an instance of the host-based firewall for each of the one or more tenants of the multi-tenant virtualized data center,
wherein, to configure the function of the host-based firewall in accordance with the one or more firewall policies, the security controller is further configured to configure the one or more firewall policies using the one or more tags and the identifier for the one or more tenants of the multi-tenant virtualized data center.

15. The system of claim 14, wherein the identifier for the one or more tenants of the multi-tenant virtualized data center comprises a virtual local area network (VLAN) identifier.

16. The system of claim 9, wherein the SDN controller is further configured to:
receive a request to create a project for the virtualized application workload to use the host-based firewall;
generate a host-based firewall object to be specified in the security policy;
in response to generating the host-based firewall object, configure a left interface, a right interface, and a management interface for a virtual execution element implementing the host-based firewall;
configure a left virtual network, a right virtual network, and a management network for the virtual execution element implementing the host-based firewall;
associate the left interface with the left virtual network;
associate the right interface with the right virtual network; and
associate the management interface with the management virtual network,
wherein, to configure network connectivity to the host-based firewall in accordance with the security policy, the SDN controller is further configured to configure network connectivity to the left virtual network and the right virtual network for the virtual execution element implementing the host-based firewall.

17. The system of claim 9, wherein the security controller is further configured to:
in response to obtaining the one or more tags from the SDN controller, convert the tags to IP addresses,
wherein, to configure the function of the host-based firewall in accordance with the one or more firewall policies, the security controller is configured to configure the function of the host-based firewall based on the IP addresses.

18. A non-transitory computer-readable medium comprising instructions that, when executed, cause one or more processors of a multi-tenant virtualized data center to:
receive a security policy expressed as one or more tags to redirect traffic of a virtualized application workload to a host-based firewall of the multi-tenant virtualized data center;
configure network connectivity to the host-based firewall in accordance with the security policy;

receive one or more firewall policies expressed in terms of the one or more tags, wherein each of the one or more firewall policies specifies a function of the host-based firewall; and configure the function of the host-based firewall in accordance with the one or more firewall policies.

19. The non-transitory computer-readable medium of claim 18, wherein the instructions further cause the one or more processors to:

configure a virtual execution element of a server of the multi-tenant virtualized data center to implement the host-based firewall, wherein the function of the host-based firewall comprises at least one of Intrusion Prevention System, Intrusion Detection System, anti-virus, and malware detection, and wherein the virtual execution element comprises a virtual machine or a container of the multi-tenant virtualized data center.

20. The non-transitory computer-readable medium of claim 18, wherein the instructions further cause the one or more processors to:

receive a request to create a project for the virtualized application workload to use the host-based firewall;

generate a host-based firewall object to be specified in the security policy;

in response to generating the host-based firewall object, configure a left interface, a right interface, and a management interface for a virtual execution element implementing the host-based firewall;

configure a left virtual network, a right virtual network, and a management network for the virtual execution element implementing the host-based firewall;

associate the left interface with the left virtual network;

associate the right interface with the right virtual network; and associate the management interface with the management virtual network, wherein, to configure network connectivity to the host-based firewall in accordance with the security policy, the instructions cause the one or more processors to configure network connectivity to the left virtual network and the right virtual network for the virtual execution element implementing the host-based firewall.

* * * * *